(12) United States Patent
Wekwert et al.

(10) Patent No.: US 12,162,374 B2
(45) Date of Patent: *Dec. 10, 2024

(54) VEHICLE BATTERY JUMP STARTER POWERED BY A REMOVABLE AND RECHARGEABLE BATTERY PACK

(71) Applicant: MILWAUKEE ELECTRIC TOOL CORPORATION, Brookfield, WI (US)

(72) Inventors: James Wekwert, Wauwatosa, WI (US); Gareth Mueckl, Milwaukee, WI (US); Randolph McHugh, Sullivan, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,459

(22) Filed: Sep. 11, 2023

(65) Prior Publication Data

US 2024/0075845 A1 Mar. 7, 2024

Related U.S. Application Data

(63) Continuation of application No. 17/588,900, filed on Jan. 31, 2022, now Pat. No. 11,752,894, which is a
(Continued)

(51) Int. Cl.
*B60L 53/80* (2019.01)
*F02N 11/12* (2006.01)
(Continued)

(52) U.S. Cl.
CPC .............. *B60L 53/80* (2019.02); *F02N 11/12* (2013.01); *H02J 1/122* (2020.01); *H02J 7/00714* (2020.01); *H02J 7/342* (2020.01)

(58) Field of Classification Search
CPC ....................................................... B60L 53/80
(Continued)

(56) References Cited

U.S. PATENT DOCUMENTS

| | | | |
|---|---|---|---|
| 6,562,509 B1 * | 5/2003 | Eggert | ............... H01M 50/247 |
| | | | 429/96 |
| 7,180,200 B2 | 2/2007 | Walter et al. | |

(Continued)

FOREIGN PATENT DOCUMENTS

| | | |
|---|---|---|
| CN | 1883095 A | 12/2006 |
| CN | 205846826 U | 12/2016 |

(Continued)

OTHER PUBLICATIONS

NOCO GB70 Genius BoostHD Jump Starter brochure, available at least as early as Jul. 13, 2018 (2 pages).
(Continued)

*Primary Examiner* — Jerry D Robbins
(74) *Attorney, Agent, or Firm* — Michael Best & Friedrich LLP

(57) ABSTRACT

A vehicle battery jump starter that is powered by a removable and rechargeable battery pack, such as a battery pack used with various hand-held power tools. The battery pack removably connects to a vehicle battery jump starter and can be selectively used to charge a power boost module within the vehicle battery jump starter. The power boost module includes, for example, a plurality of supercapacitors or lithium polymer battery cells. The power boost module in combination with the battery pack 100 can be used to jump start a vehicle battery.

20 Claims, 9 Drawing Sheets

Related U.S. Application Data continuation of application No. 16/545,118, filed on Aug. 20, 2019, now Pat. No. 11,245,280.

(60) Provisional application No. 62/720,438, filed on Aug. 21, 2018.

(51) Int. Cl.
    *H02J 1/10*         (2006.01)
    *H02J 7/00*         (2006.01)
    *H02J 7/34*         (2006.01)

(58) Field of Classification Search
    USPC ........................................................ 320/105
    See application file for complete search history.

(56) References Cited

U.S. PATENT DOCUMENTS

| | | |
|---|---|---|
| 7,309,928 B2 | 12/2007 | Grant et al. |
| 7,687,926 B2 | 3/2010 | Grant et al. |
| 7,989,969 B2 | 8/2011 | Grant et al. |
| 8,319,357 B2 | 11/2012 | Usselman et al. |
| 8,759,991 B2 | 6/2014 | Grant et al. |
| 9,007,015 B1 | 4/2015 | Nook et al. |
| 9,276,438 B2 | 3/2016 | Grant et al. |
| 9,627,908 B2 * | 4/2017 | Kaminsky ............ H01M 50/296 |
| 9,653,933 B2 | 5/2017 | Inskeep |
| 9,673,652 B2 | 6/2017 | Inskeep |
| 9,768,435 B2 | 9/2017 | Koebler et al. |
| 9,770,992 B2 | 9/2017 | Nook et al. |
| 9,819,204 B2 | 11/2017 | Miller et al. |
| 9,954,207 B2 | 4/2018 | Koebler |
| 10,174,736 B2 * | 1/2019 | Zhang ..................... H02J 7/345 |
| 10,801,460 B2 | 10/2020 | Butler et al. |
| 2003/0011344 A1 * | 1/2003 | Bertness ................ H02J 7/342 |
| | | 320/103 |
| 2005/0162124 A1 | 7/2005 | Bertness et al. |
| 2008/0265844 A1 | 10/2008 | Smith et al. |
| 2012/0091944 A1 | 4/2012 | Rogers |
| 2014/0139175 A1 * | 5/2014 | Gonzalez ................ F02N 11/12 |
| | | 320/105 |
| 2015/0130400 A1 * | 5/2015 | Inskeep ................... H02J 1/122 |
| | | 320/105 |
| 2016/0072323 A1 | 3/2016 | Miller et al. |
| 2016/0297317 A1 * | 10/2016 | Huang ................. H02J 7/0047 |
| 2016/0327007 A1 * | 11/2016 | Averbukh ............... F02N 11/14 |
| 2017/0012448 A1 | 1/2017 | Miller et al. |
| 2017/0110766 A1 | 4/2017 | Koebler |
| 2017/0163066 A1 * | 6/2017 | Inskeep ................... H02J 7/345 |
| 2017/0226980 A1 * | 8/2017 | Butler ................... H02J 7/0045 |
| 2017/0288435 A1 | 10/2017 | Miller et al. |
| 2017/0310153 A1 * | 10/2017 | Inskeep ................... B60L 53/14 |
| 2017/0317492 A1 | 11/2017 | Koebler |
| 2017/0335817 A1 | 11/2017 | De Lise et al. |
| 2017/0346140 A1 | 11/2017 | Koebler |
| 2018/0048168 A1 | 2/2018 | Miller et al. |
| 2018/0111491 A1 | 4/2018 | Nook et al. |
| 2018/0183257 A1 | 6/2018 | Minnickel et al. |
| 2018/0215274 A1 | 8/2018 | Nook et al. |
| 2018/0233934 A1 | 8/2018 | Miller et al. |
| 2018/0342883 A1 * | 11/2018 | Inskeep ................. H02J 7/0045 |
| 2020/0295575 A1 | 9/2020 | Nook et al. |

FOREIGN PATENT DOCUMENTS

| | | |
|---|---|---|
| CN | 106976445 A | 7/2017 |
| EP | 3211755 A1 | 8/2017 |
| WO | 2014166351 A1 | 10/2014 |
| WO | 2018098441 A1 | 5/2018 |

OTHER PUBLICATIONS

NOCO GB40 Genius Boost+ Jump Starter brochure, available at least as early as Jul. 13, 2018 (2 pages).
Rezervo RZ-300 Batteryless Jump Starter brochure, available at least as early as Jul. 13, 2018 (2 pages).
International Search Report and Written Opinion for Application No. PCT/US2019/047138 dated Nov. 25, 2019 (15 pages).
European Patent Office Action for Application No. 19762554.4 dated Jun. 27, 2023 (8 pages).

* cited by examiner

VEHICLE BATTERY JUMP STARTER POWERED BY A REMOVABLE AND RECHARGEABLE BATTERY PACK

RELATED APPLICATIONS

This application is a continuation of U.S. patent application Ser. No. 17/588,900, filed Jan. 31, 2022, which is a continuation of U.S. patent application Ser. No. 16/545,118, filed Aug. 20, 2019, now U.S. Pat. No. 11,245,280, which claims the benefit of U.S. Provisional Patent Application No. 62/720,438, filed Aug. 21, 2018, the entire content of each of which is hereby incorporated by reference.

FIELD

Embodiments described herein relate to a vehicle battery jump starter powered by a removable and rechargeable battery pack.

SUMMARY

Vehicle battery jump starters are subject to a number of design limitations that make the implementation of a vehicle battery jump starter difficult. For example, the vehicle battery jump starter must satisfy requirements related to voltage magnitudes (e.g., vehicle battery overvoltage), power source undervoltage (e.g., jump starter power source undervoltage), sparking and short circuiting, and electrical current magnitude. As a result of these limitations, current vehicle battery jump starters are dedicated devices with internal power sources that can be charged and then used as necessary to jump start a vehicle. These jump starters may include a sealed lead acid battery, a plurality of lithium polymer battery cells, or a bank of supercapacitors. Such devices are often charged from AC mains power. However, because AC mains power is not always readily available, it is possible that, in an emergency, the vehicle battery jump starters may lack sufficient charge to jump start a vehicle battery. In some embodiments, a depleted vehicle battery can be used to slowly charge a bank of supercapacitors, but the bank of supercapacitors alone may not always be sufficient to jump start the vehicle battery.

As an alternative to conventional vehicle battery jump starters, a vehicle battery jump starter that could be powered by a battery pack for cordless, hand-held power tools would greatly enhance the versatility of vehicle battery jump starters. Such a jump starter could be used anywhere at any time as long as a battery pack is available. One of the difficulties in implementing a vehicle battery jump starter powered by a battery pack for power tools is the magnitude of current that the battery pack is capable of producing. Electrical current limitations of battery packs in the context of vehicle battery jump starters can be mitigated or removed if the battery pack is first used to charge an energy storage device or devices (e.g., a bank of supercapacitors, lithium polymer battery cells, etc.). After the supercapacitors or lithium polymer battery cells are charged, current can be discharged from both the battery pack and the supercapacitors or lithium polymer battery cells. The battery pack discharge current in combination with discharge current from the supercapacitors or lithium polymer battery cells can be sufficient to jump start a vehicle battery. In some embodiments, just as a depleted vehicle battery can be used to charge a bank of supercapacitors, a depleted battery pack could be used alone or in conjunction with a depleted vehicle battery to charge the bank of supercapacitors. The bank of supercapacitors could then be used to attempt to jump start the vehicle battery.

Embodiments described herein provide a vehicle battery jump starter. The vehicle battery jump starter includes a battery pack interface configured to receive a removable and rechargeable battery pack, a power boost circuit including one or more energy storage devices, a first electrical cable and a second electrical cable electrically connectable to the power boost circuit, a first terminal clamp connected to the first electrical cable, and a second terminal clamp connected to the second electrical cable. The power boost circuit is configured to be charged through the battery pack interface with a discharge current from the removable and rechargeable battery pack.

Embodiments described herein provide a vehicle battery jump starter system. The system includes a removable and rechargeable battery pack and a vehicle battery jump starter. The vehicle battery jump starter includes a battery pack interface configured to receive the removable and rechargeable battery pack, a power boost circuit including one or more energy storage devices, a first electrical cable and a second electrical cable electrically connectable to the power boost circuit, a first terminal clamp connected to the first electrical cable, and a second terminal clamp connected to the second electrical cable. The power boost circuit is configured to be charged through the battery pack interface with a discharge current from the removable and rechargeable battery pack.

Embodiments described herein provide a method of jump starting a battery of a vehicle. The method includes attaching a removable and rechargeable battery pack to a vehicle battery jump starter. The vehicle battery jump starter includes a power boost circuit. The power boost circuit includes one or more energy storage devices within a housing of the vehicle battery jump starter. The method also includes electrically connecting the removable and rechargeable battery pack to the power boost circuit, charging the power boost circuit with a discharge current from the removable and rechargeable battery pack, connecting the vehicle battery jump starter to a vehicle battery, and electrically connecting the removable and rechargeable battery pack and the power boost circuit to the battery to jump start the battery.

Embodiments described herein provide a vehicle battery jump starter. The vehicle battery jump starter includes a battery pack interface, a power boost module, a precharge circuit, and a jump start switch. The battery pack interface is operable to interface with a removable and rechargeable battery pack. The power boost module is selectively charged by the removable and rechargeable battery pack using the precharge circuit. The jump start switch is operable to control discharge currents from the battery pack and the power boost module to jump start a vehicle battery.

Embodiments described herein provide a method of jump starting a vehicle battery using a vehicle battery jump starter that is powered by a removable and rechargeable battery pack. The method includes connecting the removable and rechargeable battery pack to a vehicle battery jump starter, charging a power boost module using the removable and rechargeable battery pack, and connecting the vehicle battery jump starter to a battery of a vehicle. The method also includes monitoring for an attempt to start the vehicle, electrically connecting the battery pack and the power boost module to the battery of the vehicle, monitoring the voltage of the battery to determine that the vehicle has started, and electrically disconnecting the battery pack and power boost module from the battery of the vehicle.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Embodiments described herein relate to a vehicle battery jump starter that is powered by a removable and rechargeable battery pack, such as a battery pack used with various hand-held power tools. The battery pack removably connects to a vehicle battery jump starter. The battery pack, or a plurality of battery packs connected together, can be used to power the vehicle battery jump starter and jump start a vehicle battery. The battery pack can also be selectively used to charge a power boost module within the vehicle battery jump starter. The power boost module includes, for example, an energy storage device or devices, such as a plurality of supercapacitors or lithium polymer battery cells. The power boost module in combination with the removable and rechargeable battery pack can be used to jump start the vehicle battery.

Figure 1:
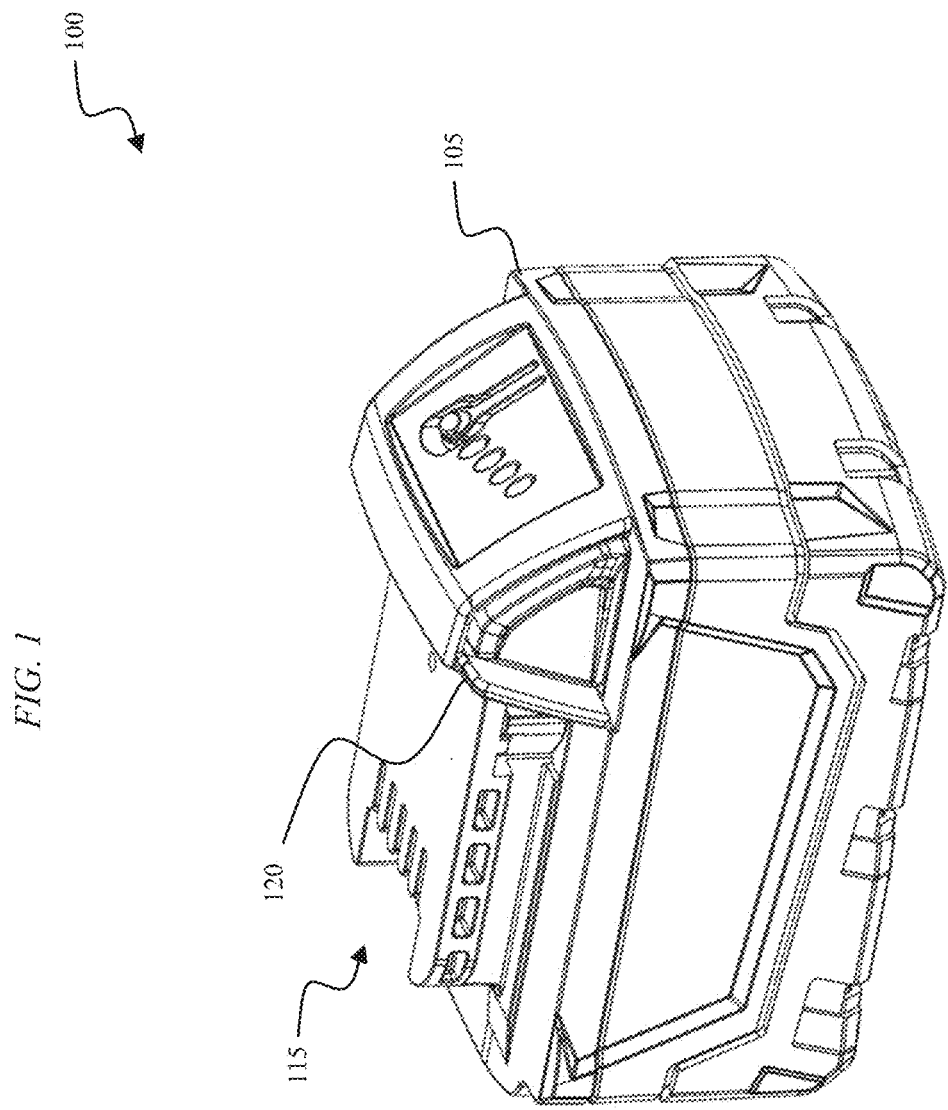
FIG. 1 is a perspective view of a battery pack, according to embodiments described herein.
Figure 2:
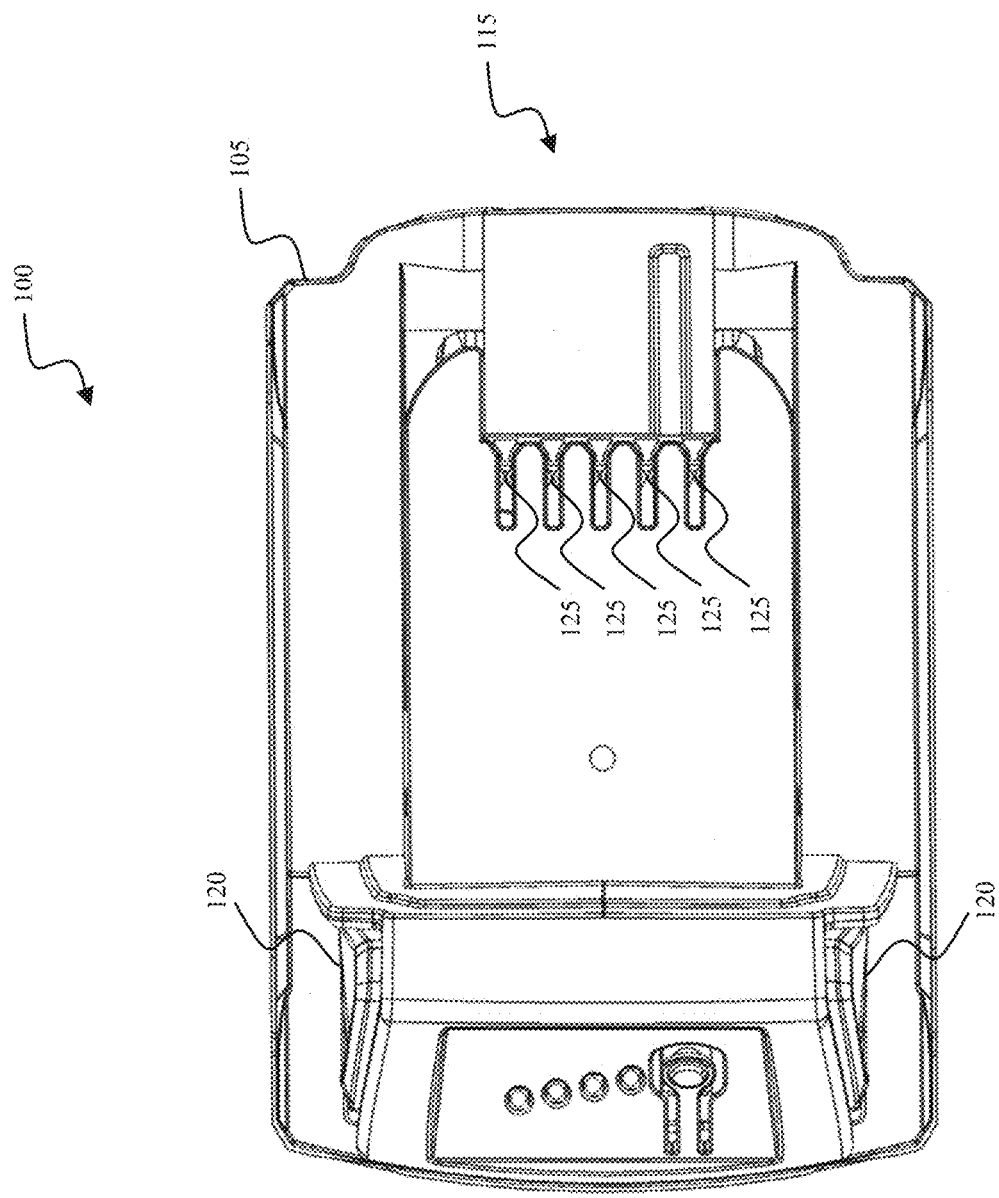
FIG. 2 is a top view of the battery pack of FIG. 1.
Figure 3:
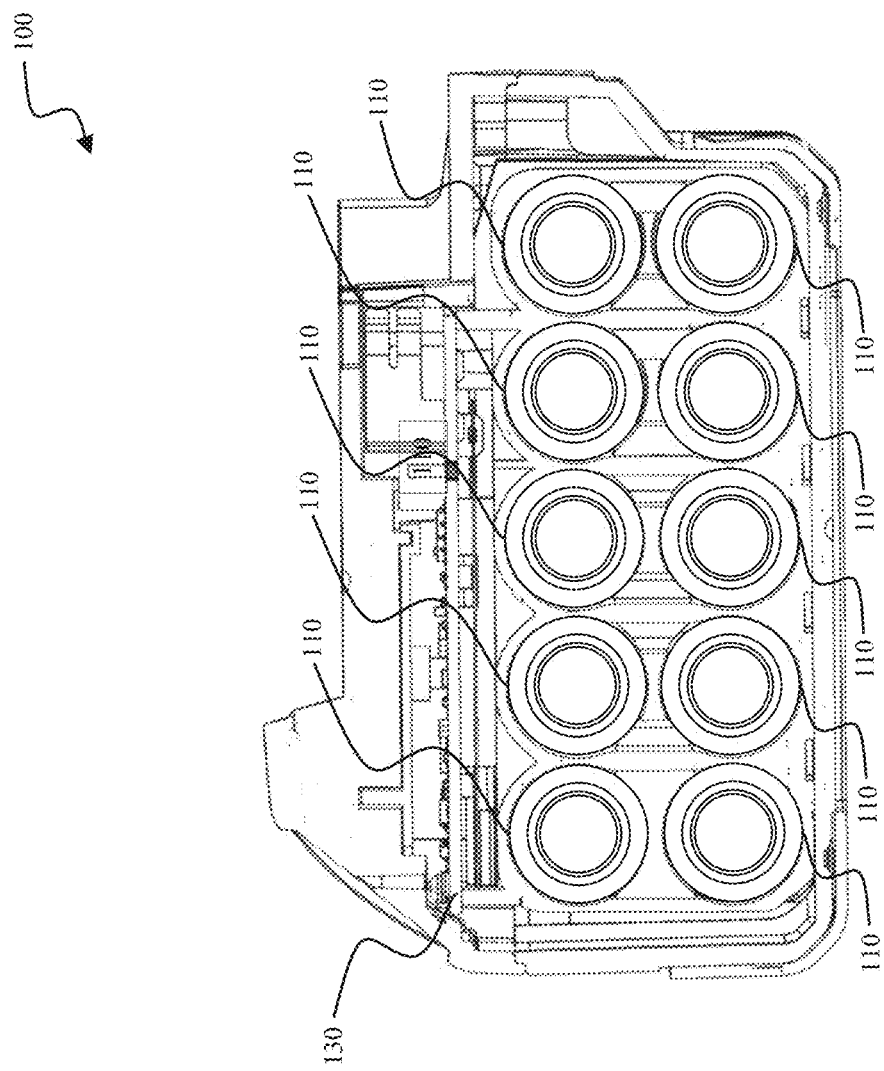
FIG. 3 is a section view of the battery pack of FIG. 1 showing battery cells, according to embodiments described herein.

FIGS. 1-3 illustrate a battery pack 100 for use with a vehicle battery jump starter. The battery pack 100 is connectable to and supportable by hand-held power tools such as drills, fasteners, saws, pipe cutters, sanders, nailers, staplers, vacuum cleaners, etc. The battery pack 100 is also connectable to and supportable by outdoor power tools such as string trimmers, hedge trimmers, blowers, chain saws, etc. As shown in FIGS. 1-3, the battery pack 100 includes a housing 105 and at least one rechargeable battery cell 110 (shown in FIG. 3) supported by the housing 105. The battery pack 100 also includes a support portion 115 for supporting the battery pack 100 on a tool, and a coupling mechanism 120 for selectively coupling the battery pack 100 to, or releasing the battery pack 100 from, the tool. The support portion 115 is connectable to a complementary support portion on the tool.

The battery pack 100 includes a plurality of terminals 125 located within the support portion 115 and operable to electrically connect the battery cells 110 to a PCB 130 within the battery pack 100. The plurality of terminals 125 includes, for example, a positive battery terminal, a ground terminal, and a sense or data terminal. The battery pack 100 is removably and interchangeably connected to a tool to provide operational power to the tool. The terminals 125 are configured to mate with corresponding power terminals extending from a tool within a complementary receiving portion or the tool.

The illustrated battery pack 100 includes ten battery cells 110. In other embodiments, the battery pack 100 can include additional or fewer battery cells 110. The battery cells can be arranged in series, parallel, or a series-parallel combination. For example, the battery pack can include a total of ten battery cells configured in a series-parallel arrangement of five sets of two series-connected cells. The series-parallel combination of battery cells allows for an increased voltage and an increased capacity of the battery pack. In some embodiments, the battery pack 100 includes five series-connected battery cells. In other embodiments, the battery pack 100 includes a different number of battery cells (e.g., between three and thirty battery cells) connected in series, parallel, or a series-parallel combination in order to produce a battery pack having a desired combination of nominal battery pack voltage and battery capacity.

The battery cells 110 are lithium-based battery cells having a chemistry of, for example, lithium-cobalt ("Li—Co"), lithium-manganese ("Li—Mn"), or Li—Mn spinel. In some embodiments, the battery cells 110 have other suitable lithium or lithium-based chemistries, such as a lithium-based chemistry that includes manganese, etc. The battery cells within the battery pack 100 provide operational power (e.g., voltage and current) to the tools. In one embodiment, each battery cell 110 has a nominal voltage of approximately 3.6V, such that the battery pack has a nominal voltage of approximately 18V. In other embodiments, the battery cells have different nominal voltages, such as, for example, between 3.6V and 4.2V, and the battery pack has a different nominal voltage, such as, for example, 10.8V, 12V, 14.4V, 24V, 28V, 36V, 60V, 80V, between 10.8V and 80V, etc. The battery cells 110 also each have a capacity of, for example, approximately between 1.0 ampere-hours ("Ah") and 6.0 Ah. In exemplary embodiments, the battery cells each have capacities of approximately, 1.5 Ah, 2.4 Ah, 3.0 Ah, 4.0 Ah, 6.0 Ah, between 1.5 Ah and 6.0 Ah, etc. In some embodiments, a battery pack 100 having a total battery pack capacity of approximately 5.0 Ah or greater (e.g., 5.0 Ah to 12.0 Ah) is used in combination with a vehicle battery jump starter. In other embodiments, a battery pack 100 having a total battery pack capacity of approximately 1.5 Ah or greater (e.g., 1.5 Ah to 12.0 Ah) is used in combination with a vehicle battery jump starter.

Figure 4:
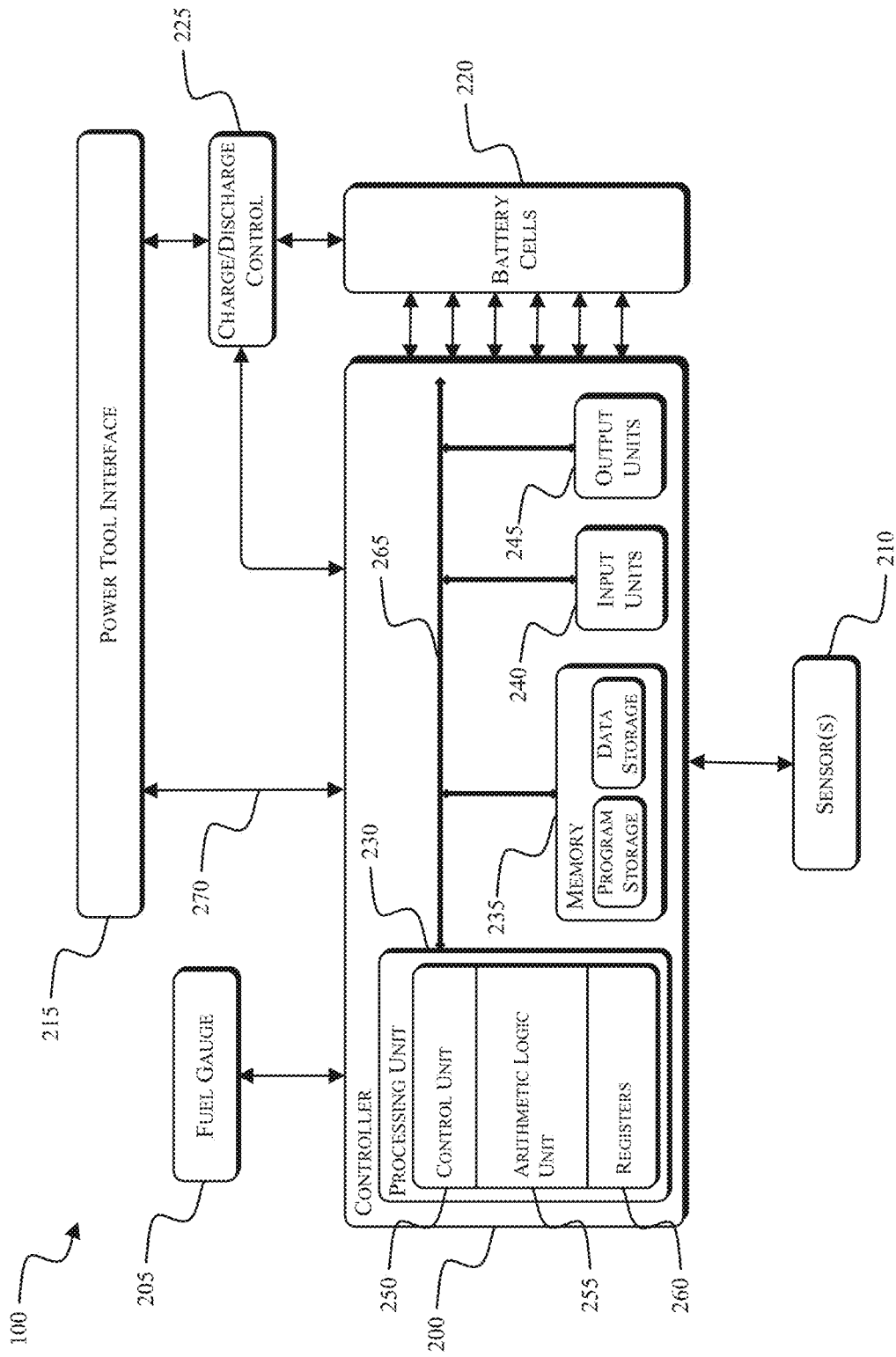
FIG. 4 is an electromechanical diagram of the battery pack of FIG. 1, according to embodiments described herein.

The power output by the battery pack 100 to a tool is controlled, monitored, and regulated using control electronics within the battery pack 100, a tool, or a combination thereof. FIG. 4 illustrates a controller 200 associated with the battery pack 100. The controller 200 is electrically and/or communicatively connected to a variety of modules or components of the battery pack 100. For example, the illustrated controller 200 is connected to a fuel gauge 205, one or more sensors 210, a tool interface 215, a plurality of battery cells 220, and a charge/discharge control module 225 (optional within battery pack). The controller 200 includes combinations of hardware and software that are operable to, among other things, control the operation of the battery pack 100, activate the fuel gauge 205, monitor the operation of the battery pack 100, etc. The fuel gauge 205 includes, for example, one or more indicators, such as light-emitting diodes ("LEDs"). The fuel gauge 205 can be configured to display conditions of, or information associated with, the state-of-charge of the battery cells 220. The controller 200 also includes a variety of preset or calculated fault condition values related to temperatures, currents, voltages, etc., associated with the operation of a tool or the battery pack 100.

In some embodiments, the controller 200 includes a plurality of electrical and electronic components that provide power, operational control, and protection to the components and modules within the controller 200 and/or battery pack 100. For example, the controller 200 includes, among other things, a processing unit 230 (e.g., a microprocessor, a microcontroller, or another suitable programmable device), a memory 235, input units 240, and output units 245. The processing unit 230 includes, among other things, a control unit 250, an arithmetic logic unit ("ALU") 255, and a plurality of registers 260 (shown as a group of registers in FIG. 4), and is implemented using a known computer architecture (e.g., a modified Harvard architecture, a von Neumann architecture, etc.). The processing unit 230, the memory 235, the input units 240, and the output units 245, as well as the various modules connected to the controller 200 are connected by one or more control and/or data buses (e.g., common bus 265). The control and/or data buses are shown generally in FIG. 4 for illustrative purposes. The use of one or more control and/or data buses for the interconnection between and communication among the various modules and components would be known to a person skilled in the art in view of the embodiments described herein. In some embodiments, the controller 200 is implemented partially or entirely on a semiconductor (e.g., a field-programmable gate array ["FPGA"] semiconductor) chip, such as a chip developed through a register transfer level ("RTL") design process.

The memory 235 is a non-transitory computer readable medium that includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 230 is connected to the memory 235 and executes software instructions that are capable of being stored in a RAM of the memory 235 (e.g., during execution), a ROM of the memory 235 (e.g., on a generally permanent basis), or another non-transitory computer readable medium such as another memory or a disc. Software included in the implementation of the battery pack 100 can be stored in the memory 235 of the controller 200. The software includes, for example, firmware, one or more applications, program data, filters, rules, one or more program modules, and other executable instructions. The controller 200 is configured to retrieve from memory and execute, among other things, instructions related to the control of the battery pack described herein. The controller 200 can also store various battery pack parameters and characteristics (including battery pack nominal voltage, chemistry, battery cell characteristics, maximum allowed discharge current, maximum allowed temperature, etc.). In other constructions, the controller 200 includes additional, fewer, or different components.

The tool interface 215 includes a combination of mechanical components (e.g., the support portion 115) and electrical components (e.g., the plurality of terminals 125) configured to, and operable for, interfacing (e.g., mechanically, electrically, and communicatively connecting) the battery pack 100 with a tool or another device. For example, power provided from the battery pack 100 to a tool or device is provided through the charge/discharge control module 225 to the tool interface 215. The charge/discharge control module 225 includes, for example, one or more switches (e.g., FETs) for controlling the charging current to and discharge current from the battery cells 220. In some embodiments, power provided from the battery pack 100 to a tool or device (or from a charger) is controlled by a charge/discharge control module 225 that is external to the battery pack 100 (i.e., internal to a tool, device, or charger). The tool interface 215 also includes, for example, a communication line 270 for providing a communication line or link between the controller 200 and a tool or device (e.g., a vehicle battery jump starter).

The sensors 210 include, for example, one or more current sensors, one or more voltage sensors, one or more temperature sensors, etc. For example, the controller 200 uses the sensors 210 to monitor an individual state of charge of each of the battery cells 220, monitor a current being discharged from the battery cells 220, monitor the temperature of one or more of the battery cells 220, etc. If the voltage of one of the battery cells 220 is equal to or above an upper voltage limit (e.g., a maximum charging voltage), the charge/discharge control module 225 prevents the battery cells from being further charged or requests that a battery charger (not shown) provide a constant voltage charging scheme. Alternatively, if one of the battery cells 220 falls below a low-voltage limit, the charge/discharge control module prevents the battery cells 220 from being further discharged. Similarly, if an upper or lower operational temperature limit for the battery cells 220 is reached, the controller 200 can prevent the battery pack 100 from being charged or discharged until the temperature of the battery cells 220 or the battery pack 100 is within an acceptable temperature range.

Figure 5:
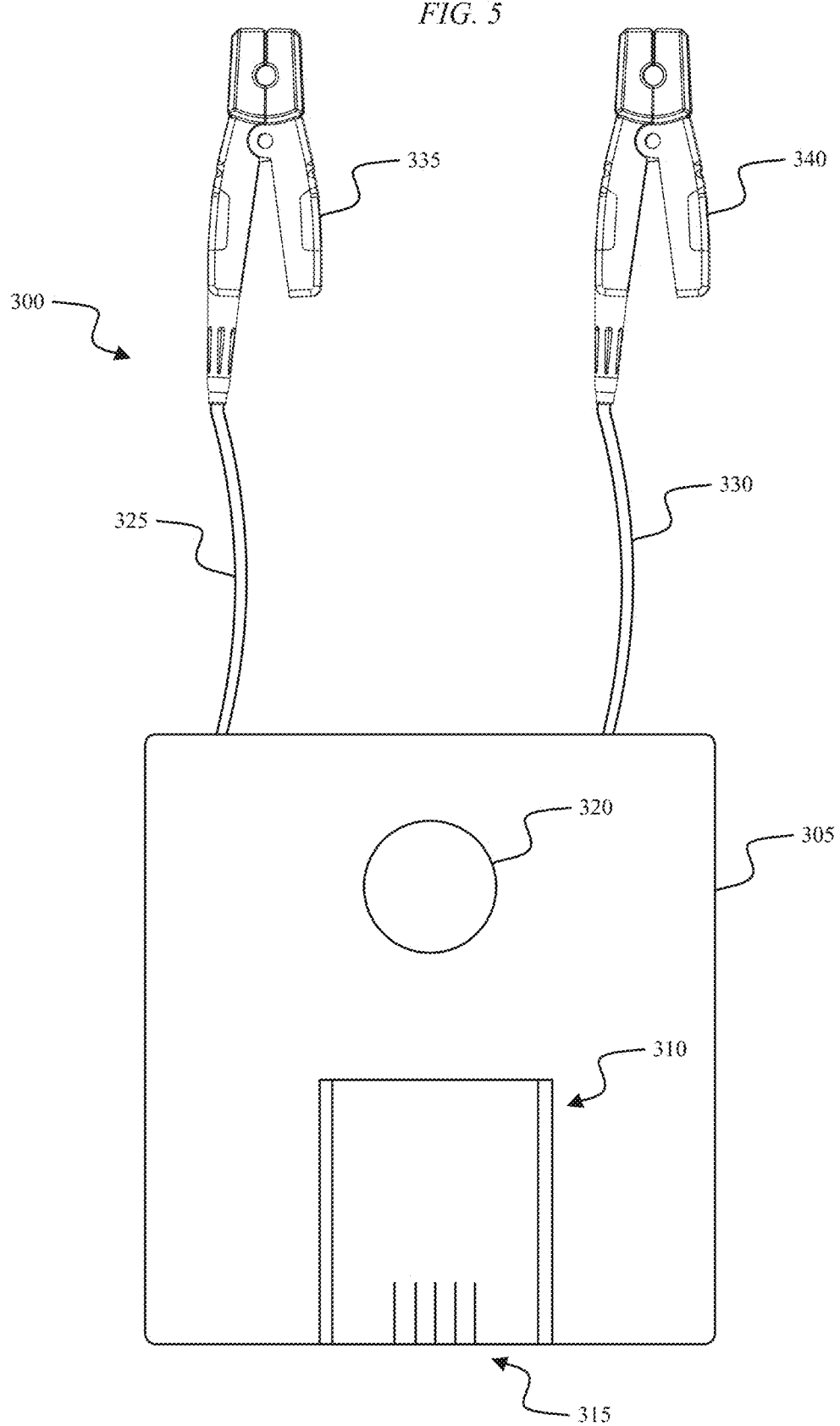
FIG. 5 illustrates a vehicle battery jump starter configured to receive, support, and be powered by the battery pack of FIG. 1, according to embodiments described herein.

The battery pack 100 is connectable to and supportable by a vehicle battery jump starter such as vehicle battery jump starter 300 illustrated in FIG. 5. The vehicle battery jump starter 300 includes a housing 305, a support portion 310 for receiving and supporting the battery pack 100, a plurality of terminals 315 for electrically connecting the battery pack 100 to the vehicle battery jump starter 300, an ON or POWER button 320 for turning ON or activating the vehicle battery jump starter 300, a first electrical cable 325, a second electrical cable 330, a first terminal clamp 335, and a second terminal clamp 340. The battery pack 100 connects to the vehicle battery jump starter 300 through the support portion 310 and the plurality of terminals 315. As a result, the battery pack 100 operates as a power source for the vehicle battery jump starter 300.

Figure 6:
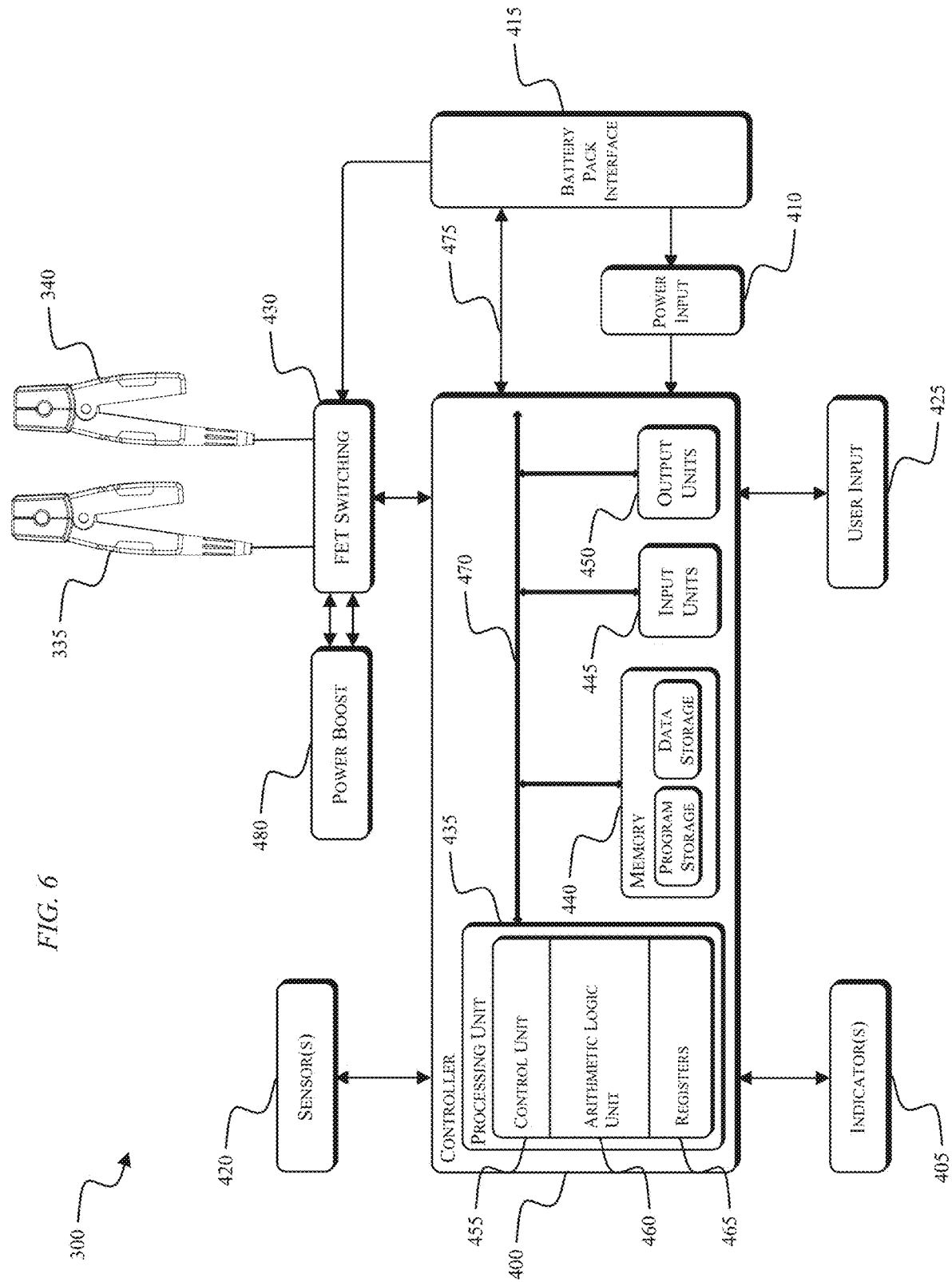
FIG. 6 is an electromechanical diagram of the vehicle battery jump starter of FIG. 5, according to embodiments described herein.

The vehicle battery jump starter 300 includes a controller 400, as shown in FIG. 6. The controller 400 is electrically and/or communicatively connected to a variety of modules or components of the vehicle battery jump starter 300. For example, the illustrated controller 400 is connected to one or more indicators 405, a power input module 410, a battery pack interface 415, one or more sensors 420, a user input module 425, and a FET switching module 430. The controller 400 includes combinations of hardware and software that are operable to, among other things, control the operation of the vehicle battery jump starter 300, monitor the operation of the vehicle battery jump starter 300, activate the one or more indicators 405 (e.g., an LED), etc. The one or more sensors 420 include, among other things, one or more voltage sensors, one or more current sensors, one or more temperature sensors, etc.

In some embodiments, the controller 400 includes a plurality of electrical and electronic components that provide power, operational control, and protection to the components and modules within the controller 400 and/or vehicle battery jump starter 300. For example, the controller 400 includes, among other things, a processing unit 435 (e.g., a microprocessor, a microcontroller, or another suitable programmable device), a memory 440, input units 445, and output units 450. The processing unit 435 includes, among other things, a control unit 455, an ALU 460, and a plurality of registers 465 (shown as a group of registers in FIG. 6), and is implemented using a known computer architecture (e.g., a modified Harvard architecture, a von Neumann architecture, etc.). The processing unit 435, the memory 440, the input units 445, and the output units 450, as well as the various modules connected to the controller 400 are connected by one or more control and/or data buses (e.g., common bus 470). The control and/or data buses are shown generally in FIG. 6 for illustrative purposes. The use of one or more control and/or data buses for the interconnection between and communication among the various modules and components would be known to a person skilled in the art in view of the embodiments described herein. In some embodiments, the controller 400 is implemented partially or entirely on a semiconductor (e.g., an FPGA semiconductor) chip.

The memory 440 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 435 is connected to the memory 440 and executes software instructions that are capable of being stored in a RAM of the memory 440 (e.g., during execution), a ROM of the memory 440 (e.g., on a generally permanent basis), or another non-transitory computer readable medium such as another memory or a disc. Software included in the implementation of the vehicle battery jump starter can be stored in the memory 440 of the controller 400. The software includes, for example, firmware, one or more applications, program data, filters, rules, one or more program modules, and other executable instructions. The controller 400 is configured to retrieve from memory and execute, among other things, instructions related to the control processes and methods described herein. In other constructions, the controller 400 includes additional, fewer, or different components.

The battery pack interface 415 includes a combination of mechanical components (e.g., the support portion 310) and electrical components (e.g., the plurality of terminals 315) configured to and operable for interfacing (e.g., mechanically, electrically, and communicatively connecting) the vehicle battery jump starter with the battery pack 100. For example, power provided by the battery pack 100 to the vehicle battery jump starter is provided through the battery pack interface 415 to a power input module 410. The power input module 410 includes combinations of active and passive components to regulate or control the power received from the battery pack 100 prior to power being provided to the controller 400. The battery pack interface 415 also includes, for example, a communication line 475 for providing a communication line or link between the controller 400 and the battery pack 100. The battery pack interface 415 supplies power to the FET switching module 430 to be switched by the switching FETs to selectively provide power to the clamps 335, 340. The FET switching module 430 is also connected to a power boost module 480. The power boost module 480 includes, for example, a plurality of supercapacitors or lithium-polymer battery cells. The power boost module 480 is selectively charged by the controller 400 with power from the battery pack 100. In some embodiments, the power boost module 480 is charged by a vehicle battery (e.g., supercapacitors can be charged from a depleted vehicle battery). The power boost module 480 can be used in conjunction with the battery pack 100 to provide power to a vehicle battery to jump start the vehicle battery. In some embodiments, the power boost module 480 alone (i.e., without battery pack 100) can be used to attempt to jump start a vehicle battery. Without the battery pack 100, however, the capabilities of the vehicle battery jump starter 300 are limited. For example, supercapacitors alone may not have the energy capacity to jump start a vehicle without the battery pack 100. Alternatively, lithium polymer battery cells require charging which may be difficult or impossible depending upon the location of the vehicle when its battery needs to be jump started.

Figure 7:
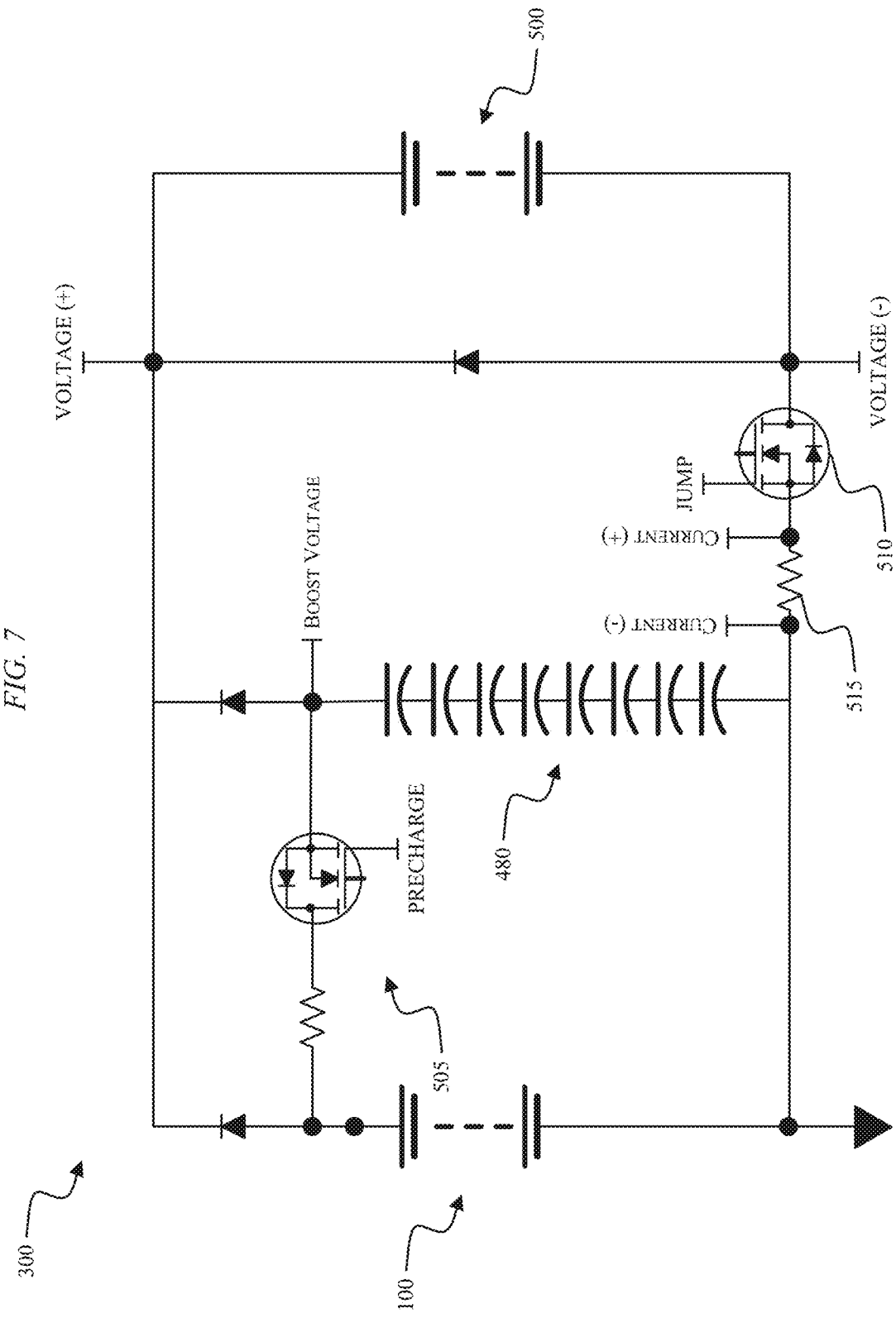
FIG. 7 is an electrical schematic diagram of the vehicle battery jump starter of FIG. 5 being powered by the battery pack of FIG. 1, according to embodiments described herein.

FIG. 7 is an electrical schematic diagram of the combination of the battery pack 100 and the vehicle battery jump starter 300. The vehicle battery jump starter 300 is connected to a vehicle battery 500. By connecting the battery pack 100 in parallel with the power boost module 495 and the vehicle battery 500, the vehicle battery jump starter 300 prevents the system voltage from exceeding 18V and potentially damaging the vehicle battery 500 or control electronics. Vehicle electrical systems typically operate at voltages ranging from a few volts (e.g., during starting) to approximately 14V (e.g., during charging). Conventional jump starters typically operate at voltages of between 10V and 14V. Higher voltage lithium-based battery packs (e.g., 18V battery packs) are problematic as jump starters due to the high internal resistance of their battery cells (e.g., compared to lithium polymer cells and supercapacitors). Increasing the number of series connected battery cells increases the internal resistance of a battery pack. Connecting battery cells in parallel reduces internal resistance. However, for a 12V lithium-based battery pack, a significant number of battery cells may need to be connected in parallel to reduce internal resistance enough to be able to jump start a vehicle battery. Counterintuitively, using an 18V lithium-based battery pack can make the battery pack appear electrically to be a 12V battery pack with reduced internal resistance. This effect can be shown numerically by applying Thevenin's theorem to calculate the 18V battery pack's Thevenin-equivalent resistance and Thevenin-equivalent voltage. As a result, a battery pack having a voltage higher than the vehicle electrical system's voltage can be used (e.g., an 18V lithium-based battery pack).

The vehicle battery jump starter 300 includes a precharge circuit 505 (e.g., including a precharge switch) that is controlled through a precharge pin connected to the controller 400, and a jump start switch 510 that is controlled through a jump pin connected to the controller 400. The controller 400 selectively controls the precharge circuit 505 to charge the supercapacitors or lithium polymer battery cells in the power boost module 480. The controller 400 controls the precharge circuit 505 to prevent the battery pack 100 from providing excessive discharge currents to the power boost module 480. For example, the precharge circuit 505 is controlled using a PWM signal from the controller 400 to limit the current from the battery pack 100 being used to charge the power boost module. In some embodiments, a resistor can be placed in the precharge circuit 505 in series with the precharge switch to limit the current discharge from the battery pack 100. In the illustrated embodiment, the power boost module 480 includes a string of series connected supercapacitors. In other embodiments, the power boost module 480 includes a plurality of supercapacitors in a parallel or series-parallel arrangement, a plurality of lithium polymer battery cells in a series, parallel, or series-parallel arrangement, or a combination of supercapacitors and lithium polymer battery cells connected in a series, parallel, or series-parallel configuration. One skilled in the art, in light of this disclosure, would understand how to combine supercapacitors and/or lithium polymer battery cells in series, parallel, or a series parallel configuration to achieve a desired voltage and current output from the power boost module 480.

The vehicle battery jump starter 300 also includes a current sensor 515 (e.g., a shunt resistor) so the controller 400 can monitor the current being discharged to the vehicle battery 500, as well as positive and negative voltage taps that allow the controller 400 to monitor the voltage of the vehicle battery 500. The controller 400 can monitor discharge current during an attempted jump start to ensure that the current being discharged does not exceed a high current threshold value or a particular value for an extended period of time. For example, the battery pack 100 in combination with the power boost module output a combined current of approximately 750 A for approximately 50 milliseconds to jump start the vehicle battery 500, and a combined current of 200 A or more for several seconds thereafter. In order to protect the battery pack 100 and the vehicle battery jump starter 300, the controller 400 can prevent the vehicle battery jump starter 300 from discharging current in excess of 500 A for more than 100 milliseconds or greater than 200 A for five seconds. These limits can vary based on the battery pack being used to power the vehicle battery jump starter 300. However, in each instance, discharge current limits are in place to prevent damage to the battery pack 100, the vehicle battery jump starter 300, or the vehicle battery 500.

In addition to the discharge current limitations of the battery pack 100, the battery pack 100 also has voltage and temperature limitations within which it must operate. Each of the discharge current, voltage, and temperature limitations of the battery pack 100 can be monitored and controlled by the controller 200 of the battery pack. The power boost module 480 also has discharge current, voltage, and temperature limitations independent from those of the battery pack 100 within which it must operate. Each of the discharge current, voltage, and temperature limitations of the power boost module 480 can be monitored and controlled by the controller 400 of the vehicle battery jump starter 300. In some embodiments, each of the battery cells 220 and the power boost module 480 (e.g., including supercapacitors, lithium polymer battery cells, or a combination of supercapacitors and lithium polymer battery cells) can be independently disconnected in the event of a current, voltage, or temperature limit being reached (i.e., a fault condition).

Figure 8:
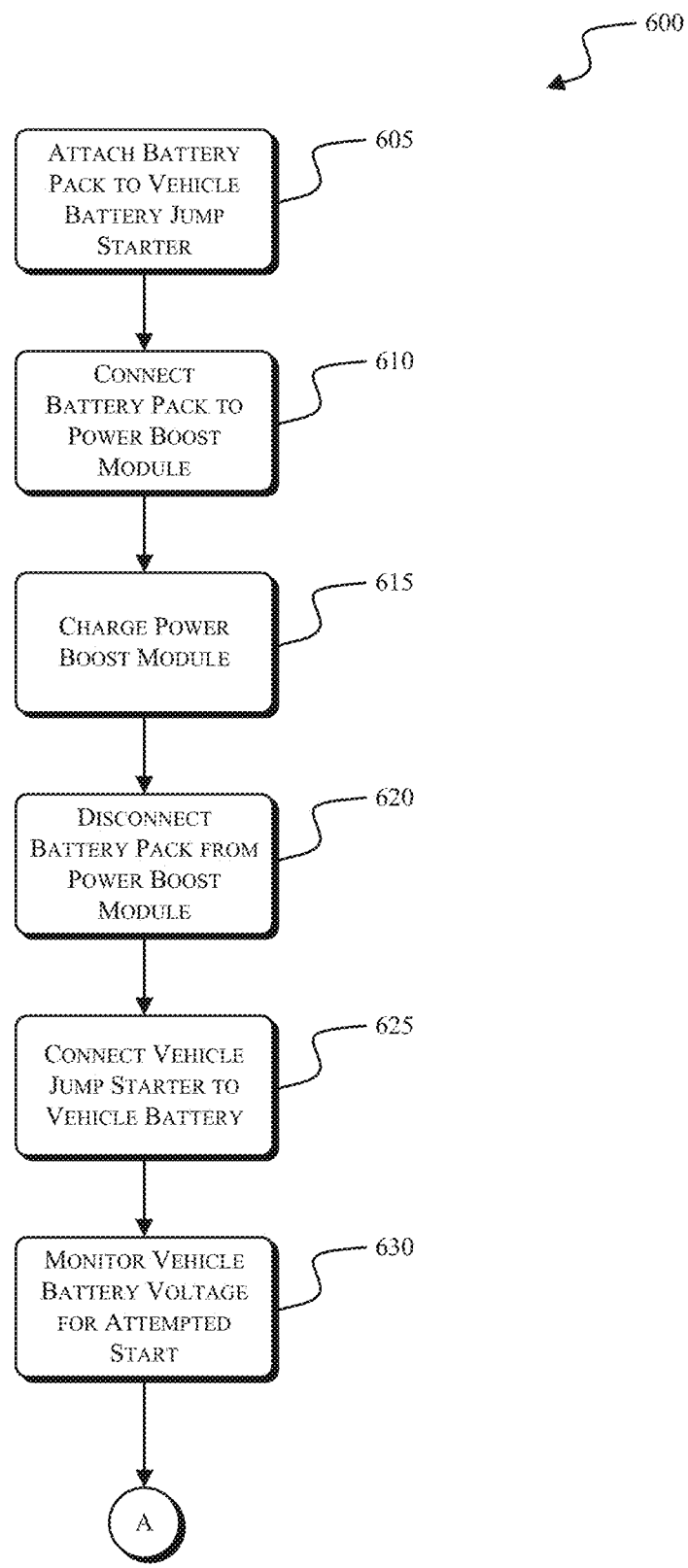
FIGS. 8 and 9 are a process for jump starting a vehicle battery using the vehicle battery jump starter of FIG. 5 being powered by the battery pack of FIG. 1, according to embodiments described herein.
Figure 9:
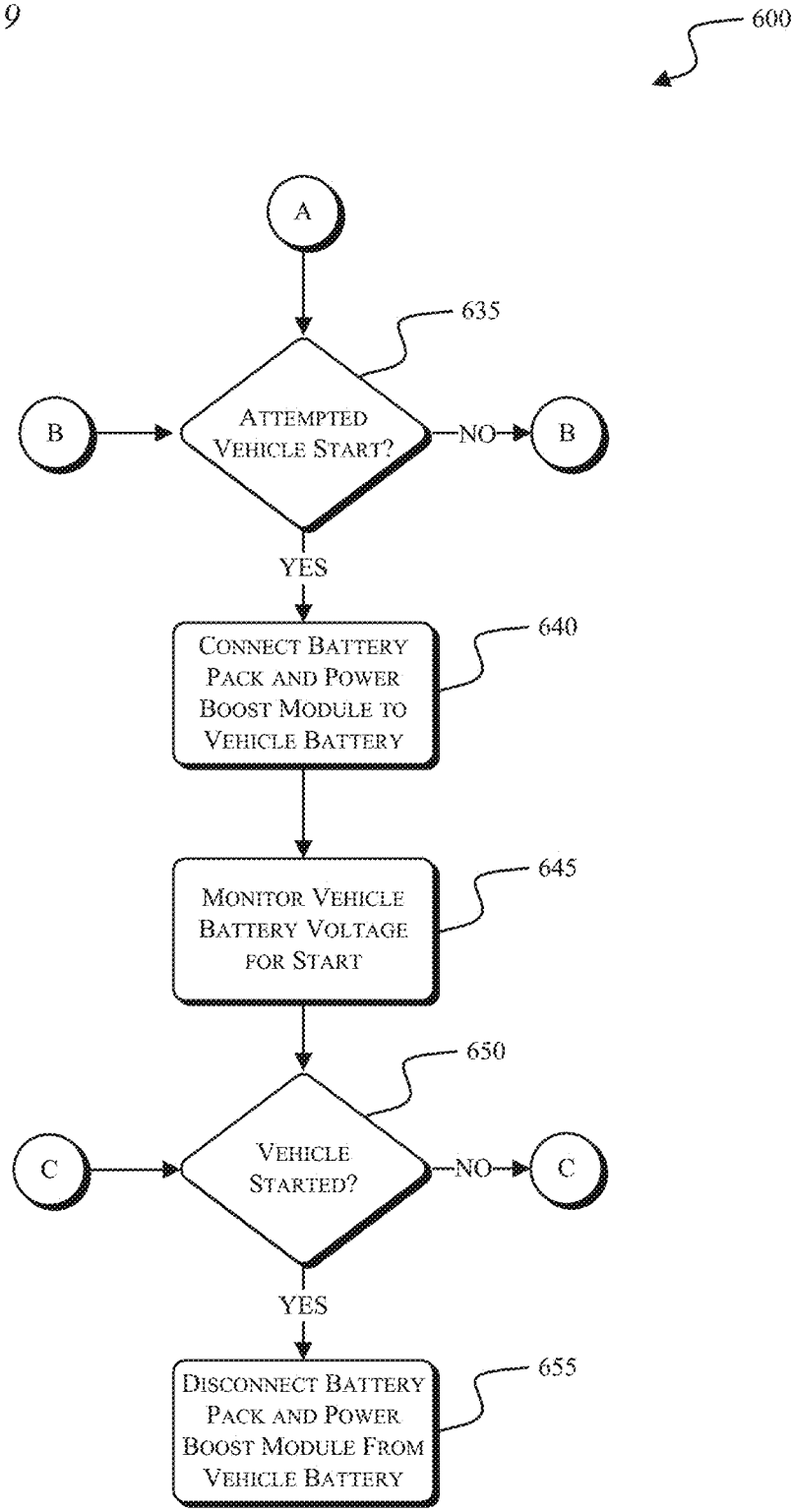

The operation of the combination of battery pack 100 and vehicle battery jump starter 300 is described with respect to a process 600 in FIGS. 8 and 9. The process 600 begins with the battery pack 100 being attached to the vehicle battery jump starter 300 (STEP 605). Following STEP 605, the controller 400 of the vehicle battery jump starter 300 controls the precharge circuit 505 to electrically connect the battery pack 100 to the power boost module 480 (STEP 610). After the battery pack 100 is connected to the power boost module 480, stored energy from the battery pack 100 can be used to charge the power boost module 480 (STEP 615). After the power boost module 480 has been fully charged, the controller 400 controls the precharge circuit 505 to electrically disconnect the battery pack 100 from the power boost module 480 (STEP 620). With the power boost module 480 charged and the battery pack 100 connected to the vehicle battery jump starter 300, the combination of the battery pack 100 and the vehicle battery jump starter can be used to jump start the vehicle battery 500.

The controller 400 of the vehicle battery jump starter or the controller 200 of the battery pack 100 can selectively prevent the battery pack 100 from being used to jump start the vehicle battery 500 if the voltage of the battery pack 100 is so low that attempting to jump start the vehicle battery 500 could damage the battery pack 100. For example, in addition to a standard low-voltage cutoff for the battery cells 220 of the battery pack 100, a second low-voltage threshold value can be implemented to prevent the battery pack 100 from being used to jump start a vehicle. The battery pack 100 can determine that it is connected to the vehicle battery jump starter 300 (e.g., rather than a hand held power tool) via communication with the vehicle battery jump starter 300 or an identification device (e.g., a resistor). The controller 200 of the battery pack 100 can then prevent the battery pack 100 from discharging current when the battery pack 100's voltage is below the second threshold value and discharging current would drop the voltage of the battery pack 100 below the standard low-voltage cutoff (e.g., 2.6V per cell). The second voltage threshold value is selected to correspond to the amount of energy required to jump start the vehicle battery 500 or an expected voltage reduction resulting from the discharge of the high current necessary to jump start a vehicle battery. If the battery pack 100 has less charge than would be required to jump start the vehicle battery 500, and attempting to jump start the vehicle battery 500 would cause the battery pack 100's voltage to be depleted below or fall below the standard low-voltage cutoff, the controller 200 prevents the battery pack 100 from attempting to jump start the vehicle battery 500.

At STEP 625, the vehicle battery jump starter 300 is connected to the vehicle battery 500 via terminal clamps 335 and 340. Once the vehicle battery jump starter 300 is connected to the vehicle battery 500, the controller 400 monitors the voltage across the vehicle battery 500 (STEP 630). When an attempt to start a vehicle is made, the voltage of the vehicle battery 500 is reduced. This reduction in voltage of the vehicle battery 500 signals to the controller 400 that an attempt to start the vehicle has been made. The process 600 then proceeds to control section A shown in and described with respect to FIG. 9.

With reference to FIG. 9, if an attempt to start a vehicle has not been made at STEP 635, the process 600 waits at STEP 635 for a vehicle start attempt to be made (or for a timeout condition of the controller 400 to occur). After a vehicle start attempt is detected by the controller 400 at STEP 635, the controller 400 electrically connects the battery pack 100 and the power boost module 480 to the vehicle battery 500 (STEP 640). In some embodiments, the controller 400 uses the JUMP START switch 510 to prevent discharge from the vehicle battery jump starter 300 when there is a low resistance between VOLTAGE (+) and VOLTAGE (−) terminals of the vehicle battery jump starter 300. Such a low resistance can be caused by shorted jumper cables or a shorted vehicle battery 500. The controller 400 can detect such a condition and use the JUMP START switch 510 to prevent discharge and, as a result, prevent sparking. In some embodiments, the JUMP START switch 510 is used as an override switch to connect the battery pack 100 and power boost module 480 to the vehicle battery 500 without attempting to jump start the vehicle battery 500. For example, diesel vehicles require glow plugs to be sufficiently warm to cause fuel ignition. A depleted vehicle battery may not be able to sufficiently warm the glow plugs alone. By connecting the battery pack 100 and power boost module 480 to the vehicle's battery through the JUMP START switch 510, power from the battery pack 100 and the power boost module 480 can be used to warm the glow plugs. Additionally, newer vehicles may electronically prevent an operator from trying to start a vehicle if the vehicle's battery is depleted (e.g., even if a jump starter is attached). Connecting the battery pack 100 and power boost module 480 to the vehicle's battery through the JUMP START switch 510 can raise the vehicle's system voltage enough to allow the operator to attempt to start the vehicle.

As the jump start current is being provided from the battery pack 100 and power boost module 480 to the vehicle battery 500, the controller 400 monitors the voltage of the vehicle battery 500 (STEP 645). When the controller 400 determines that the vehicle has not yet been started at STEP 650, the process 600 remains at STEP 650 until the vehicle starts (or a timeout condition of the controller 400 or low-voltage condition of the battery pack 100 occurs). When, at STEP 650, the controller 400 detects that the vehicle has started, the controller 400 electrically disconnects the battery pack 100 and the power boost module 495 from the vehicle battery 500. The vehicle battery jump starter 300 and clamps 335, 340 can then be physically disconnected.

Thus, embodiments described herein provide, among other things, a vehicle battery jump starter powered by a removable and rechargeable battery pack. Various features and advantages are set forth in the following claims.

What is claimed is:

1. A vehicle battery jump starter comprising:
    a first controller including a first electronic processor;
    a battery pack interface configured to receive a removable and rechargeable battery pack, the battery pack including a second controller including a second electronic processor and electrically coupled in parallel to an external vehicle battery; and
    a power boost module including one or more energy storage devices and electrically coupled in parallel to the external vehicle battery and the removable and rechargeable battery pack;
    wherein at least one of the first controller and the second controller is configured to adjust an operating parameter of the battery pack when the battery pack is attached to the battery pack interface.

2. The vehicle battery jump starter of claim 1, further comprising:
    a precharge circuit configured to control a charging current provided to the power boost module.

3. The vehicle battery jump starter of claim 2, further comprising:
    a jump start switch configured to control a discharge current from the power boost module.

4. The vehicle battery jump starter of claim 3, wherein the jump start switch is configured to provide a discharge current from one of the power boost module and/or the removable and rechargeable battery pack prior to the external vehicle battery prior to a jump start operation being performed.

5. The vehicle battery jump starter of claim 1, wherein the operating parameter is a voltage threshold; and
    wherein the at least one of the first controller and the second controller is configured to prevent operation of the battery pack when a voltage of the battery pack is less than the voltage threshold.

6. The vehicle battery jump starter of claim 1, wherein the one or more energy storage devices include at least one selected from the group including one or more supercapacitors and one or more lithium polymer battery cells.

7. The vehicle battery jump starter of claim 1, wherein the power boost module is configured to be charged through the battery pack interface with a discharge current from the removable and rechargeable battery pack.

8. The vehicle battery jump starter of claim 1, wherein the power boost module is configured to be charged through the external vehicle battery.

9. A vehicle battery jump starter system comprising:
    a controller including an electronic processor;
    a power tool battery pack; and
    a vehicle battery jump starter including:
        a battery pack interface configured to receive the power tool battery pack, and
        a power boost module including one or more energy storage devices,
        wherein the power tool battery pack and the power boost module are electrically connected in parallel to a vehicle battery,
        wherein the controller is configured to adjust an operating parameter of the battery pack when the battery pack is attached to the battery pack interface.

10. The system of claim 9, wherein the vehicle battery jump starter includes a precharge circuit configured to control a charging current provided to the power boost module.

11. The system of claim 10, wherein the charging current is provided by the power tool battery pack.

12. The system of claim 10, wherein the charging current is provided by the vehicle battery.

13. The system of claim 9, wherein the vehicle battery jump starter includes a jump start switch configured to control a discharge current from the power boost module.

14. The system of claim 13, wherein the jump start switch is configured to provide a discharge current from one of the power boost module and/or the power tool battery pack prior to the vehicle battery prior to a jump start operation being performed.

15. The system of claim 9, wherein the operating parameter is a voltage threshold; and
wherein the controller is configured to prevent operation of the battery pack when a voltage of the battery pack is less than the voltage threshold.

16. The system of claim 9, wherein the battery pack interface includes:
a support portion configured to receive and support the power tool battery pack; and
a plurality of terminals configured to electrically connect the power tool battery pack to the vehicle battery jump starter.

17. The system of claim 9, wherein the power tool battery pack has a nominal voltage of at least 12V.

18. A method of jump starting a battery of a vehicle, the method comprising:
attaching a removable and rechargeable battery pack to a vehicle battery jump starter, the vehicle battery jump starter including a power boost module, the power boost module including one or more energy storage devices within a housing of the vehicle battery jump starter;
adjusting, by a controller including an electronic processor, an operating parameter of the removable and rechargeable battery pack when the removable and rechargeable battery pack is attached to the vehicle battery jump starter;
electrically connecting the removable and rechargeable battery pack to the power boost module;
charging the power boost module with a discharge current from the removable and rechargeable battery pack; and
connecting the vehicle battery jump starter to a vehicle battery, wherein the vehicle battery is electrically connected in parallel to the power boost module and the removable and rechargeable battery pack.

19. The method of claim 18, further comprising:
monitoring a voltage of the battery; and
determine when the vehicle has started based on the monitored voltage.

20. The method of claim 18, further comprising:
electrically disconnecting the removable and rechargeable battery pack from the power boost module when the power boost module has been charged.

* * * * *